United States Patent
Miyamaru

(10) Patent No.: US 11,656,898 B2
(45) Date of Patent: May 23, 2023

(54) INFORMATION PROCESSING DEVICE, METHOD, AND PROGRAM

(71) Applicant: Mitsubishi Electric Corporation, Tokyo (JP)

(72) Inventor: Takuya Miyamaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 301 days.

(21) Appl. No.: 16/964,207

(22) PCT Filed: Mar. 20, 2018

(86) PCT No.: PCT/JP2018/011023
§ 371 (c)(1),
(2) Date: Jul. 23, 2020

(87) PCT Pub. No.: WO2019/180812
PCT Pub. Date: Sep. 26, 2019

(65) Prior Publication Data
US 2021/0042143 A1    Feb. 11, 2021

(51) Int. Cl.
*G06F 9/455* (2018.01)
*G06F 3/06* (2006.01)
(52) U.S. Cl.
CPC ........ *G06F 9/45558* (2013.01); *G06F 3/0604* (2013.01); *G06F 3/0655* (2013.01);
(Continued)
(58) Field of Classification Search
None
See application file for complete search history.

(56) References Cited

U.S. PATENT DOCUMENTS

| 7,181,744 B2 | 2/2007 | Shultz et al. |
| 9,400,671 B2 | 7/2016 | Chuang et al. |

(Continued)

FOREIGN PATENT DOCUMENTS

| JP | 08-235011 A | 9/1996 |
| JP | 2009-301117 A | 12/2009 |

(Continued)

OTHER PUBLICATIONS

International Search Report and Written Opinion dated Jun. 12, 2018 for PCT/JP2018/011023 filed on Mar. 20, 2018, 6 pages including English Translation of the International Search Report.

(Continued)

*Primary Examiner* — Wynuel S Aquino
(74) *Attorney, Agent, or Firm* — Xsensus LLP

(57) ABSTRACT

A guest operating system (120) of a virtual machine (12) writes, into a shared memory (111), data destined for a virtual machine (13) together with a destination ID and a source ID. The delivery manager (181) supplies data to a communicator (182) when a determination is made that an information processing device (21) is specified in a delivery information table (161) as a delivery destination corresponding to the destination ID and the source ID. The communicator (182) transmits the data supplied from the delivery manager (181) to the information processing device. The delivery manager (181) writes first data into a shared memory (112) and delivers the first data to the virtual machine (13) when determining that a delivery destination corresponding to the destination ID and the source ID is not specified in the deliver information table (161).

20 Claims, 18 Drawing Sheets

(52) U.S. Cl.
CPC .. *G06F 3/0679* (2013.01); *G06F 2009/45579* (2013.01); *G06F 2009/45583* (2013.01)

(56) References Cited

U.S. PATENT DOCUMENTS

| | | |
|---|---|---|
| 2006/0206892 A1 | 9/2006 | Vega et al. |
| 2015/0242236 A1 | 8/2015 | Nakazono |
| 2016/0124763 A1* | 5/2016 | Tsirkin ................ G06F 9/45558 718/1 |
| 2017/0090800 A1 | 3/2017 | Alexandrovich et al. |
| 2017/0374106 A1* | 12/2017 | Hamou ............... H04L 41/0895 |
| 2018/0046581 A1* | 2/2018 | Banerjee ............... G06F 11/079 |
| 2018/0225237 A1* | 8/2018 | Edirisooriya ............. G06F 9/54 |
| 2018/0287938 A1* | 10/2018 | Han ................... H04L 12/4633 |

FOREIGN PATENT DOCUMENTS

| | | |
|---|---|---|
| JP | 2010-193357 A | 9/2010 |
| JP | 2015-158773 A | 9/2015 |
| TW | 249106 B | 2/2006 |
| TW | I588751 B | 6/2017 |
| TW | 201729137 A | 8/2017 |

OTHER PUBLICATIONS

Decision to Grant a Patent received for Japanese Patent Application No. 2019-508998, dated Mar. 12, 2019, 5 pages including English Translation.

* cited by examiner

| No. | SHARED MEMORY HEADER | | | DELIVERY DESTINATION | UPDATE HEADER | | |
|---|---|---|---|---|---|---|---|
| | DESTINATION ID | SOURCE ID | TYPE | | DESTINATION ID | SOURCE ID | TYPE |
| 1 | VM13 | VM12 | APP1 | INFORMATION PROCESSING DEVICE 21 | VM23 | VM22 | APP1 |
| 2 | VM13 | VM12 | APP2 | INFORMATION PROCESSING DEVICE 21 | VM23 | VM22 | APP3 |
| 3 | VM12 | VM13 | APP2 | LOCAL HOST | – | – | – |
| 4 | VM13 | VM12 | APP3 | LOCAL HOST | VM13 | VM12 | APP1 |
| ⋮ | ⋮ | ⋮ | ⋮ | ⋮ | ⋮ | ⋮ | ⋮ |

| DELIVERY SETTING NO. | MEMORY ADDRESS | CONDITION | THRESHOLD | ENABLED/ DISABLED |
|---|---|---|---|---|
| No.1 | 0x100000 | EQUAL | 100 | ENABLED |
| No.2 | 0x100020 | LESS | 200 | ENABLED |
| No.3 | 0x134000 | AT LEAST | 1 | DISABLED |
| ... | ... | ... | ... | ... |

| DELIVERY SETTING NO. | START TIME | START TIME | END TIME | END TIME | ENABLE/ DISABLED |
|---|---|---|---|---|---|
| No.4 | NOVEMBER 10, 2017 | 13 H 59 M 30 S | NOVEMBER 11, 2017 | 14 H 59 M 30 S | ENABLED |
| ... | ... | ... | ... | ... | ... |

| No. | SHARED MEMORY HEADER | | | DELIVERY DESTINATION | UPDATE HEADER | | |
|---|---|---|---|---|---|---|---|
| | DESTINATION ID | SOURCE ID | TYPE | | DESTINATION ID | SOURCE ID | TYPE |
| 1 | VM13 | VM12 | APP1 | INFORMATION PROCESSING DEVICE 21 | VM23 | VM22 | APP1 |
| 2 | VM13 | VM12 | APP2 | INFORMATION PROCESSING DEVICE 21 | VM23 | VM22 | APP3 |
| 3 | VM12 | VM13 | APP2 | LOCAL HOST | – | – | – |
| 4 | VM13 | VM12 | APP3 | LOCAL HOST | VM13 | VM12 | APP1 |
| 5 | VM13 | VM12 | APP1 | LOCAL HOST | VM14 | VM12 | APP3 |
| ⋮ | ⋮ | ⋮ | ⋮ | ⋮ | ⋮ | ⋮ | ⋮ |

| No. | SHARED MEMORY HEADER | | | DELIVERY DESTINATION | UPDATE HEADER | | | STARTUP CONDITION |
|---|---|---|---|---|---|---|---|---|
| | DESTINATION ID | SOURCE ID | TYPE | | DESTINATION ID | SOURCE ID | TYPE | |
| 1 | VM13 | VM12 | APP1 | INFORMATION PROCESSING DEVICE 21 | VM23 | VM22 | APP1 | ENABLED IF VALUE OF MEMORY ADDRESS 0x100000 MATCHES 100 |
| 2 | VM13 | VM12 | APP2 | INFORMATION PROCESSING DEVICE 21 | VM23 | VM22 | APP3 | DISABLED IF VALUE OF MEMORY ADDRESS 0x100020 < 200 |
| 3 | VM12 | VM13 | APP2 | LOCAL HOST | — | — | — | DISABLED IF VALUE OF MEMORY ADDRESS 0x134000 > 1 |
| 4 | VM13 | VM12 | APP3 | LOCAL HOST | VM13 | VM12 | APP1 | ENABLED DURING 11/10/2017 1:59:30 PM TO 11/11/2017 2:59:30 PM |
| ⋮ | ⋮ | ⋮ | ⋮ | ⋮ | ⋮ | ⋮ | ⋮ | ⋮ |

161

INFORMATION PROCESSING DEVICE, METHOD, AND PROGRAM

CROSS-REFERENCE TO RELATED APPLICATION

The present application is based on PCT filing PCT/JP2018/011023, filed Mar. 20, 2018, the entire contents of which are incorporated herein by reference.

TECHNICAL FIELD

The present disclosure relates to an information processing device, a method, and a program.

BACKGROUND ART

Applications may run in conjunction with one another on a virtual machine built as a virtual environment in an information processing device. For example, in a field of factory automation, a control application for controlling a drive device, an inspection device, and the like is executed on the virtual machine on which a real-time operating system runs. In addition, an information processing application for processing inspection data output by the inspection device is executed on another virtual machine on which a non-real-time operating system runs.

Modifications to a certain application may be added due to a change to the specification, a malfunction, or the like. In this case, the modified application is typically run for operation verification in a testing environment different from a production environment. Although in the testing environment, dummy data for testing may be used in verification, there may be cases in which verification is preferably performed using data collected in the production environment. Examples of such cases include a case of modification to an application to address a malfunction occurring only in the production environment.

Patent Literature 1 describes building up of a production environment and a testing environment in the same information processing device and sharing of file resources between the production environment and the testing environment. Such a configuration can achieve verification in the testing environment using data collected in the production environment.

To build the testing environment in a production information processing device as in Patent Literature 1, for the information processing device with a virtual environment built therein, one or more virtual machines need to be newly added to the information processing device. However, addition of the virtual machine may cause the existing virtual machine to operate unstably, which may result in an adverse effect on an operating state in the production environment. For example, in the field of factory automation, unstable operation of a virtual machine on which an application for controlling a drive device, an inspection device, and the like is running may adversely affect operating states of the drive device, the inspection device, and the like. In a worst case, a problem such as runaway of the drive device, the inspection device, and the like is predicted to occur.

CITATION LIST

Patent Literature

Patent Literature 1: Unexamined Japanese Patent Application Publication No. H8-235011

SUMMARY OF INVENTION

Technical Problem

The above problem can be obviated by running an application such as the application for controlling the drive device, the inspection device, and the like, on a virtual machine of another information processing device during verification. In this case, however, the virtual machine that operates on another information processing device needs to communicate.

In a case in which a communication destination is changed to the virtual machine of another information processing device, settings of the virtual machine on the production environment and settings of the application that operates on the virtual machine of another information processing device are needed, which may adversely affect operations in the production environment.

In view of the above circumstances, an objective of the present disclosure is to enable communication among virtual machines of information processing devices without changing of the virtual machine side settings.

Solution to Problem

To achieve the above objective, an information processing device according to the present disclosure is an information processing device on which a virtual environment including virtual machines is built. The information processing device includes a root operating system to operate on the information processing device, guest operating systems to operate on the corresponding virtual machines, a shared memory accessible by the guest operating systems and the root operating system, and delivery information storage means for specifying a relationship between (i) destination information indicating destinations of data specified by the virtual machines and source information indicating sources of the data, and (ii) delivery destination for the data to be actually delivered. The root operating system includes delivery management means for managing delivery of data output by the virtual machines and communication means for communicating via a communication paths with another information processing device. When the guest operating system of a first virtual machine of the virtual machines writes, into the shared memory, first data that is destined for a second virtual machine of the virtual machines together with the destination information and the source information, the delivery management means determines whether a delivery destination corresponding to the destination information and the source information is specified in the delivery information storage means. Upon determination that the another information processing device is specified in the delivery information storage means as the delivery destination corresponding to the destination information and the source information, the delivery management means supplies the first data to the communication means and transmits to the another information processing device the first data supplied from the delivery management means. Upon determination that a delivery destination corresponding to the destination information and the source information is not specified in the delivery information storage means, the delivery management means delivers the first data to the second virtual machine.

Advantageous Effects of Invention

In the information processing device according to the present disclosure, when a determination is made that another information processing device is specified in the delivery information storage means as the delivery destination corresponding to the destination information and the source information for the first data written by the first virtual machine into the shared memory, the delivery management means supplies the first data to the communication means, and the communication means transmits the first data supplied by the delivery management means to the another information processing device. Such a configuration enables the virtual machines of the information processing devices to communicate with one another among the information processing devices.

BRIEF DESCRIPTION OF DRAWINGS

FIG. 5 is a drawing illustrating an example of data that is recorded in a delivery information table according to the embodiment;

FIG. 7 is a drawing illustrating another example of data that is recorded in the startup condition table according to the embodiment;

FIG. 14 is a drawing illustrating an example of data that is recorded in a delivery information table according to the modified example;

FIG. 16 is a drawing illustrating another example of data that is recorded in the delivery information table;

DESCRIPTION OF EMBODIMENTS

Embodiments

Figure 1:
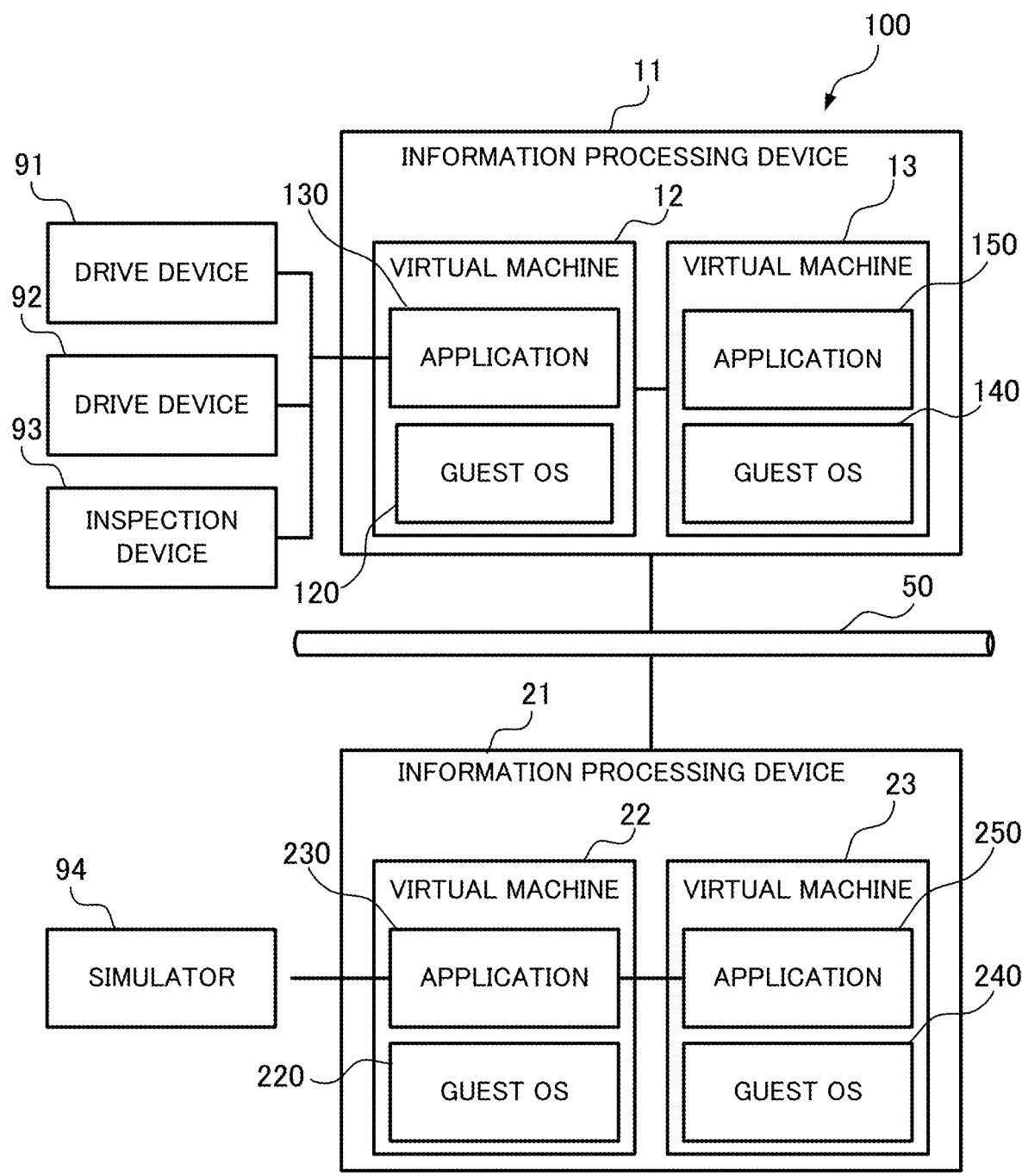
FIG. 1 is a drawing illustrating an overview of a configuration of an information processing system according to an embodiment of the present disclosure

As illustrated in FIG. 1, an information processing system 100 according to an embodiment of the present disclosure includes an information processing device 11 and an information processing device 21 that can communicate with each other via a communication path 50. The information processing device 11 is a device that operates as a production environment of a factory automation (FA) control system. The information processing device 21 is a device for a testing environment of the FA control system Here, the information processing device 11 is installed in a factory and the information processing device 21 is installed in a place other than the factory. Thus the information processing device 11 is connected via the communication path 50 to the information processing device 21. The communication path 50 is apart of a not-illustrated local area network (LAN).

Each of the information processing devices 11 and 21 has a virtual environment built thereon. Virtual machines 12 and 13 operate on the information processing device 11. Virtual machines 22 and 23 operate on the information processing device 21. In FIG. 1, illustration of a root operating system installed in each of the information processing devices 11 and 21 that are host machines is omitted.

The virtual machine 12 functions as a programmable logic controller. The virtual machine 12 is connected to drive devices 91 and 92 and an inspection device 93 that are located in the factory. The virtual machine 12 is an example of the first virtual machine of the present disclosure. A guest operating system (hereinafter referred to as a guest OS) 120 of the virtual machine 12 executes an application 130 for control. The application 130 is firmware of the programmable logic controller. The application 130 performs processing relating to control of the drive devices 91 and 92 and processing for collection of inspection data of the inspection device 93. For example, the application 130 collects, as inspection data, image data obtained by capturing an image of a production part by the inspection device 93, and sends the image data to the virtual machine 13.

The virtual machine 13 functions as a computer that performs information processing. The virtual machine 13 is an example of the second virtual machine of the present disclosure. The guest OS 140 of the virtual machine 13 executes an application 150 for information processing, such as a quality control application that analyzes on-site inspection data and provides feedback to a production line. The application 150 performs analysis processing for analyzing the inspection data of the inspection device 93. For example, the application 150 analyzes image data that is obtained by capturing by the inspection device 93 and received from the application 130 of the virtual machine 12, generates data indicating an analysis-based quality state, such as aggregated data obtained by correcting the number of rejects, and sends the generated data indicating a quality state to the virtual machine 12.

The virtual machine 22 includes a configuration similar to the virtual machine 12, and functions as a programmable logic controller. Unlike the virtual machine 12, the virtual machine 22 does not control the information processing device thereof. The virtual machine 22 is connected to a simulator 94. The simulator 94 is implemented by execution of a program for simulation by a personal computer.

The virtual machine 23 has a configuration similar to that of the virtual machine 13, and functions as a computer that performs information processing.

During operation of the production environment, the virtual machines 12 and 13 of the information processing device 11 operate in cooperation with each other. During operation verification of the application, the virtual machines 22 and 23 of the information processing device 21 for the testing environment operate in cooperation with each other.

In addition, in the present embodiment, since the operation verification of the application is performed using data collected in the production environment, the virtual machine 12 of the information processing device 11 and the virtual machine 23 of the information processing device 21 can operate in cooperation with each other. The virtual machine 13 of the information processing device 11 and the virtual machine 22 of the information processing device 21 can operate in cooperation with each other. Thus any of the information processing devices 11 and 21 can deliver data sent by one of the virtual machines to another virtual machine of the same information processing device to another information processing device specified by a user. In other words, data that is sent addressed for another virtual machine of the same information processing device can be transferred to another information processing device specified by a user.

Figure 2:
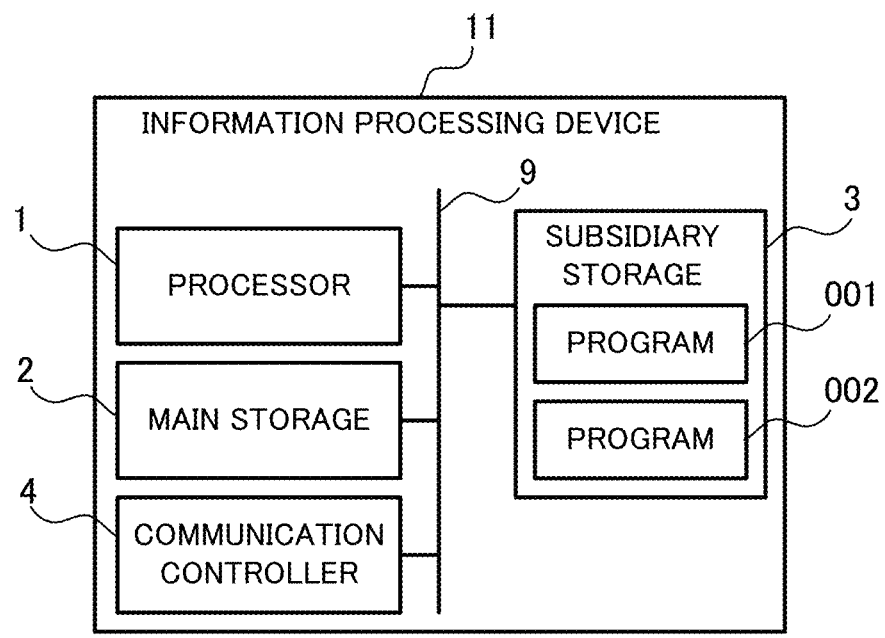
-FIG. 2 is a block diagram illustrating a hardware configuration of an information processing device according to the embodiment.

As illustrated in FIG. 2, the information processing device 11 includes, as a hardware configuration, a processor 1, a main storage 2, a subsidiary storage 3, and a communication controller 4. The main storage 2, the subsidiary storage 3, and the communication controller 4 are all connected via an internal bus 9 to the processor 1 and communication with the processor 1. The hardware configuration of the information processing device 21 is similar to the configuration of the information processing device 11.

The processor 1 includes a central processing unit (CPU). The processor 1 executes various programs stored in the subsidiary storage 3 to implement various functions of the information processing device 11.

The main storage 2 includes a volatile memory and is used as a working memory of the processor 1. The processor 1 loads into the main storage 2 a program, a parameter, and the like stored in the subsidiary storage 3, and performs various kinds of processing using the program, the parameter, and the like loaded in the main storage 2.

The subsidiary storage 3 includes a nonvolatile memory. The subsidiary storage 3 stores a program, a parameter, and the like. The subsidiary storage 3 stores a program 001 for implementing functions of a delivery manager 181 described later, and a program 002 for implementing functions of the communicator 182. The subsidiary storage 3 further stores a program for creation of the virtual machines 12 and 13, a program for execution of the application 130 of the virtual machine 12, a program for execution of the application 150 of the virtual machine 13, and the like.

The communication controller 4 includes a network interface for communication via the communication path 50. The communication controller 4 receives a signal transmitted via the communication path 50, and outputs to the processor 1 data indicated by the received signal. The communication controller 4 also transmits, via the communication path 50 to the information processing device 21, a signal indicated data supplied from the processor 1.

Figure 3:
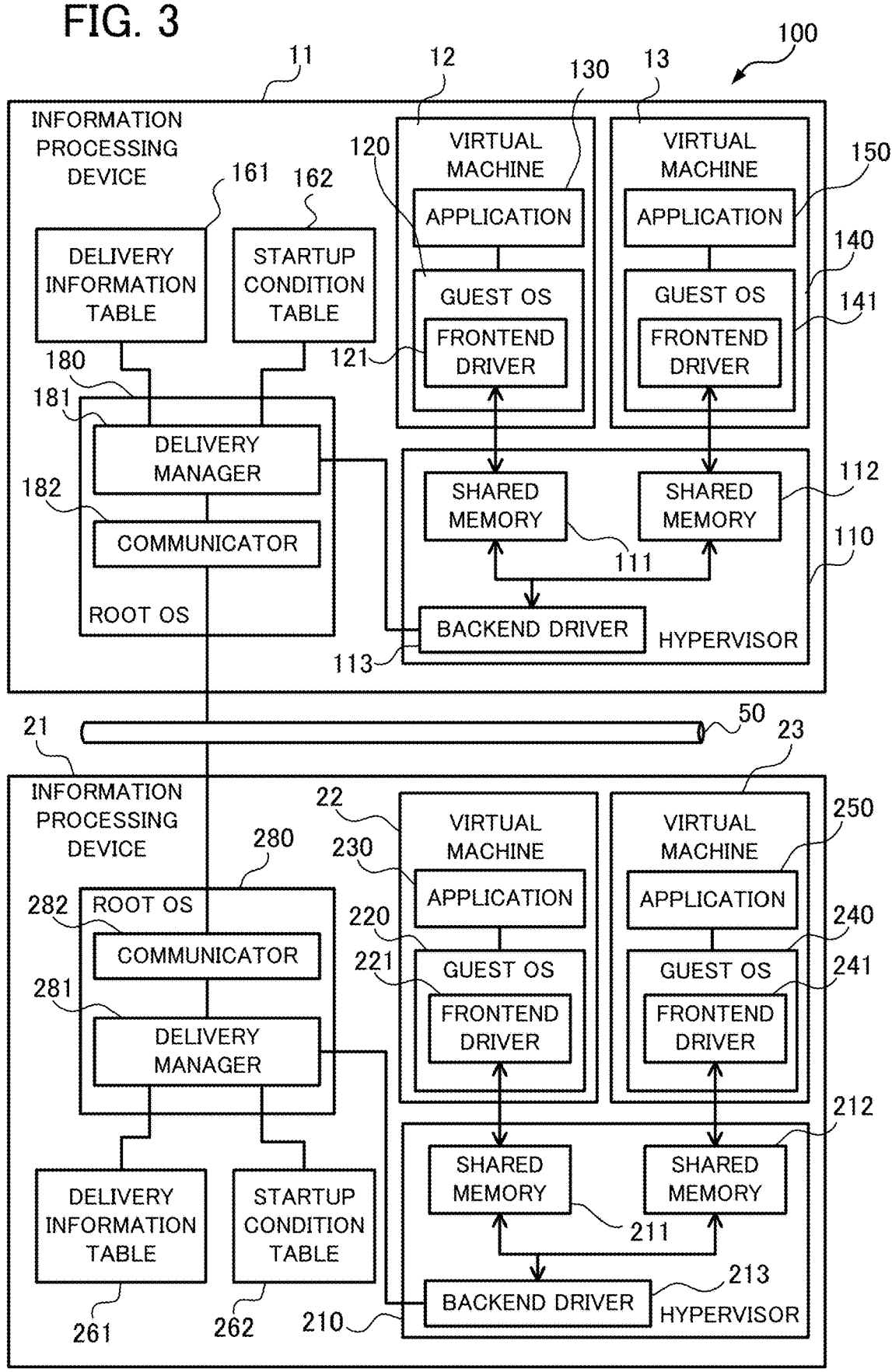
FIG. 3 is a functional block diagram of the information processing device according to the embodiment.

As illustrated in FIG. 3, the information processing device 11 functionally includes a hypervisor 110 that manages the virtual machines 12 and 13, a guest OS 120 and an application 130 that operate on the virtual machine 12, a guest OS 140 and an application 150 that operate on the virtual machine 13, a root operating system (hereinafter referred to as a root OS) 180 that is installed on the information processing device 11 that is a host machine and operates on the host machine, a delivery information table 161 in which a delivery destination that is a destination for data sent and received between the virtual machines 12 and 13 is recorded, and a startup condition table 162 in which information on enablement or disablement of information recorded in the delivery information table 161. The delivery information table 161 is an example of delivery information storage means of the present disclosure. The startup condition table 162 is an example of enablement-disablement setting conditions storing means of the present disclosure.

The hypervisor 110 creates the virtual machines 12 and 13 in accordance with control of the root OS 180 described later, and manages the created virtual machines 12 and 13. The hypervisor 110 is implemented by the processor 1 by execution of a dedicated program stored in the subsidiary storage 3.

The hypervisor 110 includes a shared memory 111 assigned to the virtual machine 12, a shared memory 112 assigned to the virtual machine 13, and a backend driver 113 that is a virtual device driver. The shared memory 111 is used for data exchange between the guest OS 120 and the root OS 180. Thus the guest OS 120 and the root OS 180 can access the shared memory 111. Writing data into the shared memory 111 may be hereinafter expressed as setting data. The shared memory 112 is implemented by the subsidiary storage 3. The shared memory 112 is used for data exchange between the guest OS 140 and the root OS 180. Thus the guest OS 140 and the root OS 180 can access the shared memory 112. The shared memory 112 is implemented by the subsidiary storage 3.

In the present embodiment, data cannot be directly sent and received between the guest OS 120 and the guest OS 140. Thus the root OS 180 performs data passing between the guest OS 120 and the gest OS 140 using the shared memories 11 and 112. For example, when the guest OS 120 sends data to the guest OS 140, the guest OS 120 first set in the shared memory 111 data to be sent to the guest OS 140. The root OS 180 reads the data set in the shared memory 111 by the guest OS 120. The root OS 180 sets the read data in the shared memory 112. The guest OS reads the data set in the shared memory 112 by the root OS 180. In this way, data is passed from the guest OS 120 to the guest OS 140. The same applies to passing of data from the guest OS 140 to the guest OS 120.

The backend driver 113 reads data from and writes data to the shared memories 111 and 112 in accordance with control of the root OS 180.

The guest OS 120 is an operating system executed on the virtual machine 12. In the present embodiment, a real time operating system (RTOS) is assumed as the guest OS 120. The guest OS 120 starts up the application 130 upon instruction by the root OS 180. The guest OS 120 exchanges data with the root OS 180 by using the shared memory 111. The guest OS 120 is implemented by the processor 1 by execution of a program stored in the subsidiary storage 3.

The guest OS 120 has a frontend driver 121 that is a virtual device driver. The frontend driver 121 reads data from and writes data to the shared memory 111 under control of the guest OS 120.

The guest OS 120 controls the frontend driver 121 to write output data of the application 130 into the shared memory 111.

Figure 4:
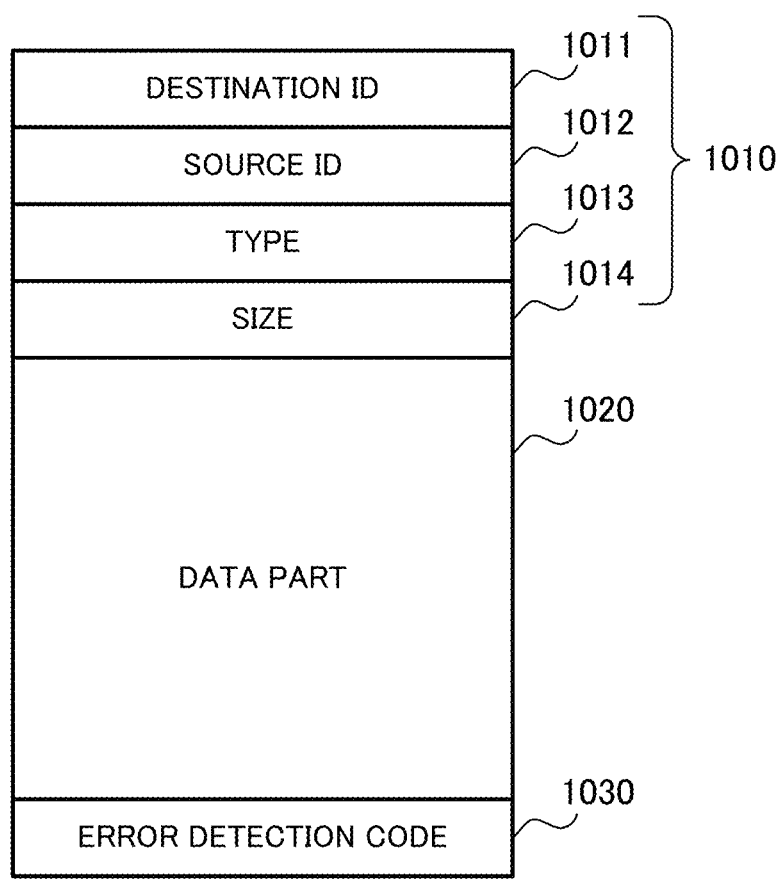
FIG. 4 is a diagram illustrating a configuration of data that is set in a shared memory according to the embodiment.

FIG. 4 illustrates an example of a format of data that the guest OS 120 sets in the shared memory 111. The data set in the shared memory 111 includes a header 1010, a data part 1020, and an error detection code 1030.

The header 1010 includes a destination identification (ID) that is identification information of a destination virtual machine, a source ID 1012 that is identification information of a source virtual machine, a type 1013 that is information indicating identification information for identifying an application that outputs data, and a size 1014 that is information indicating a size of a data part 1020. The destination ID 1011 is an example of the destination information of the present disclosure, the source ID 1012 is an example of the source information of the present disclosure, and the type 1013 is an example of the identification information of the present disclosure.

For example, when the virtual machine 12 sends output data of the application 130 to the virtual machine 13, a value such as that indicated as follows is set to each part of the header 1010. An ID indicating the virtual machine 13 is set to the destination ID 1011, an ID indicating the virtual machine 12 is set to the source ID 1012, and identification information of the application 130 is set to a value of the type 1013.

The data part 1020 includes output data of the application 130. For example, the data part 1020 includes inspection data collected by the application 130 from the inspection device 93. The error detection code 1030 is a code for error detection. As an error detection scheme, for example, cyclic redundancy check (CRC), parity, hamming, or the like can be used.

The guest OS 120 also controls the frontend driver 121 to read data set in the shared memory 111 by the root OS. A format of data set by the root OS 180 in the shared memory 111 is similar to the example illustrated in FIG. 4.

The guest OS 120 illustrated in FIG. 3 further controls the frontend driver 121 to perform bus communication via the virtual bus with the root OS 180. Specifically, the guest OS 120 controls the frontend driver 121 to send to the root OS 180 a signal of dataset notification that provides notification that the data is written into the shared memory 111. Due to receiving of this signal, the root OS 180 reads the data from the shared memory 111.

When the root OS 180 sets data to the shared memory 111, the root OS 180 sends a signal of dataset notification that notifies the frontend driver 121 of the setting of the data. When the frontend driver 121 receives the signal, the guest OS 120 controls the frontend driver 121 to read the data from the shared memory 111.

The application 130 performs processing relating to control of the drive devices 91 and 92, and processing for collecting inspection data of the inspection device 93. The application 130 collects the inspection data from the inspection device 93 and sends the inspection data to the virtual machine 13. The application 130 starts up by the guest OS 120 executing the program stored in the subsidiary storage 3.

The guest OS 140 is an operating system executed on the virtual machine 13. In the present embodiment, a non-real time OS is assumed as the guest OS 140. The guest OS 140 starts up the application 150 upon being instructed by the root OS 180. The guest OS 140 also exchanges data with the root OS 180 using the shared memory 112. The guest OS 140 is implemented by the processor 1 executing a program stored in the subsidiary storage 3.

The guest OS 140 has the frontend driver 141 that is a virtual device driver. The frontend driver 141 performs reading and writing of data to the shared memory 112 under control of the guest OS 140. The guest OS 140 controls the frontend driver 141 to write output data of the application 150 to the shared memory 112. The format of data set in the shared memory 112 by the guest OS 140 is the same as that of the example illustrated in FIG. 4. Here, the data part 1020 is set to the data output by the application 150. The guest OS 140 also controls the frontend driver 141 to read the data set in the shared memory 112 by the root OS 180. A format of data set by the root OS 180 in the shared memory 112 is similar to that of the example illustrated in FIG. 4.

The OS 140 illustrated in FIG. 3 further controls the frontend driver 141 to perform a bus communication via the virtual bus with the root OS 180. Upon setting of the data in the shared memory 112, the guest OS 140 controls the frontend driver 141 to send the signal of the dataset notification to the root OS 180. Upon receiving this signal, the root OS 180 reads the data from the shared memory 112 using the backend driver 113.

When the root OS 180 sets the data in the shared memory 112, the root OS 180 sends the signal of the dataset notification to the frontend driver 141. When the frontend driver 141 receives this signal, the guest OS 140 controls the frontend driver 141 to read the data from the shared memory 112.

The application 150 performs analysis processing for analyzing inspection data of the inspection device 93. For example, the application 150 analyzes the inspection data received from the application 130 of the virtual machine 12, generates data indicating a quality state based on the analysis, and sends the generated data indicating the quality state to the virtual machine 12. The application 150 starts up by the guest OS 140 executing the program stored in the subsidiary storage 3.

The guest OS 120 and guest OS 140 each set the ID indicating the destination virtual machine to the destination ID 1011 of the header 1010. Either one of the virtual machines 12 and 13 of the same information processing device 11 is specified as the destination. As described above, however, when transferring to another information processing device is specified by the user, the root OS 180 transfers the data set by the virtual machines 12 and 13 in the shared memories 111 and 112 to the destination specified by the user. The root OS 180 also rewrites, based on the specification by the user, information of the header 1010 of the data set by the virtual machines 12 and 13 to the shared memories 111 and 112. The delivery information table 161 and the startup condition table 162 are used for the aforementioned processing of the root OS 180.

Delivery destinations that are destinations for delivery of data by the virtual machines 12 and 13 are recorded beforehand in the delivery information table 161. Recording in the delivery information table 161 is performed as follows. First, a user creates data to be recorded in the delivery information table 161 using an unillustrated tool for recording. The user connects the tool for registration to the information processing device 11 via a communication cable, uploads the created data to the information processing device 11, and records the data in the delivery information table 161. Here, the tool for registration is a dedicated program installed in the personal computer.

The delivery information table 161 has information of the header 1010 set by the guest OS 120 and the guest OS 140 in the shared memories 1 and 112 and information indicating the correspondence to the delivery destination of data. More specifically, the delivery information table 161 has the delivery destination of data specified by the destination ID 1011 indicating the destination virtual machine, the source ID 1012 indicating the source virtual machine, and the type 1013 that is identification information of the application that outputs the data. A value of the header 1010 to be updated at the time of transmission is specified in the delivery information table 161.

FIG. 5 illustrates an example of data recorded in the delivery information table 161. In the following decryption, the ID for identifying the virtual machine 12 is taken as "VM12", the ID for identifying the virtual machine 13 is taken as "VM13", the ID for identifying the virtual machine 22 is taken as "VM22", and the ID for identifying the virtual machine 23 is taken as "VM23". The values set in the type 1013 are assumed to include identification information "APP1" of an application for numeical calculation, identification information "APP2" of an application for control, and identification information "APP3" of an application for image processing.

As illustrated in FIG. 5, in the delivery setting No. 1, the delivery destination is specified as the "information processing device 21" when the destination ID 1011 is "VM13", the source ID 1012 is "VM12", and the type 1013 is "APP1". Although the values such as the "information processing device 21" are recorded as information for identifying the information processing devices in the illustrated example, internet protocol (IP) addresses of the information processing devices may be specified as the delivery destinations.

In the delivery setting No. 1 of an update header, the destination ID 1011 is "VM23", the source ID 1012 is "VM22", and the type 1013 is "APP". This indicates that the header 1010 is specified such that the destination ID 1011 is updated to "VM23", the source ID 1012 is updated to "VM22", and the type 1013 is updated to "APP1".

For example, the guest OS 120 of the virtual machine 12 is assumed to store the data output by the application for numerical calculation in the shared menory 11 in a format illustrated in FIG. 4 as data destined for the virtual machine 13. In this case, the header 1010 of the data is set such that the destination ID 1011 is "VM13", the source ID 1012 is "VM12", and the type 1013 is "APP". In this case, as illustrated in FIG. 5, the number of delivery setting that matches the information set in the header 101 is number 1. In the delivery setting of number 1, the "information processing device 21" is specified as a delivery destination. Thus the data is delivered to the information processing device 21 by the delivery manager 181 and the communicator 182 described below.

In addition, the header 1010 is updated in accordance with the delivery setting No. 1 by the delivery manager 181 such that the destination ID 1011 is "VM23", the source ID 1012 is "VM22", and the type 1013 is "APP1". Thus the virtual machine 23 of the information processing device 21 having received the data regards the received data as the data output from the application for numerical calculation of the virtual machine 22 of the same information processing device 21.

As illustrated in FIG. 5, in the delivery setting number 2, the delivery destination is specified as the "information processing device 21" when the destination ID 1011 is "VM13", the source ID 1012 is "VM12", and the type 1013 is "APP2". In addition, in the delivery setting number 2, the header 1010 is specified to be updated such that the destination ID 1011 is "VM23", the source ID 1012 is "VM22", and the type 1013 is "APP3".

When the virtual machine 12 illustrated in FIG. 3 stores, in the shared memory 111, the output data of the application for control as data destined for the virtual machine 13, the data is delivered for the information processing device 21 in accordance with the delivery setting number 2 illustrated in FIG. 5. In the delivery of the data, each value of the header 1010 is updated with the update header of the delivery setting number 2. Thus the data received by the information processing device 21 has "VM23" as the destination ID 1011, "VM22" as the source ID 1012, and "APP3" as the type 1013. Thus the virtual machine 23 of the information processing device 21 regards the received data as the data output from the application for image processing of the virtual machine 22 of the same information processing device 21.

In the delivery setting No. 3, information of the update header is not recorded when the destination ID 1011 is "VM12", the source ID 1012 is "VM13", and the type 1013 is "APP2". This means that the data is not to be delivered anywhere.

When the virtual machine 13 illustrated in FIG. 3 stores, in the shared memory 112, the output data of the application for control as data destined for the virtual machine 12, in accordance with the delivery setting number 3 illustrated in FIG. 5, the data is not delivered anywhere. That is, communication from the virtual machine 13 to the virtual machine 12 is shut off.

In the delivery setting number 4, a "local host", that is, its own information processing device 11 is specified as the delivery destination when the destination ID 1011 is "VM13", the source ID 1012 is "VM12", and the type 1013 is "APP3". In the deliver setting number 4, the header 1010 is specified to be updated such that the destination ID 1011 is "VM13", the source ID 1012 is "VM12", and the type 1013 is "APP".

When the virtual machine 12 illustrated in FIG. 3 stores, in the shared memory 111, the output data of the application for image processing as data destined for the virtual machine 13, the data is delivered for the virtual machine 13 of the same information processing device 11 in accordance with the delivery setting number 4 illustrated in FIG. 5. In the delivery of the data, each value of the header 1010 is updated with the update header of the delivery setting number 4. Thus the data received by the virtual machine 13 has "APP3" as the type 1013. Thus the virtual machine 13 regards the received data as the data output from the application for numerical calculation.

Information indicating whether each delivery setting of the delivery information table 161 is enabled or disabled is recorded beforehand in the startup condition table 162. Similarly to the data of the delivery information table 161, the data in the startup condition table 162 is created by the user using the tool for recording and uploaded to the information processing device 11, and thus the data is recorded in the startup condition table 162.

In the embodiment, each delivery setting of the delivery information table 161 is enabled or disabled when a condition defined in the startup condition table 162 is satisfied.

Figure 6:
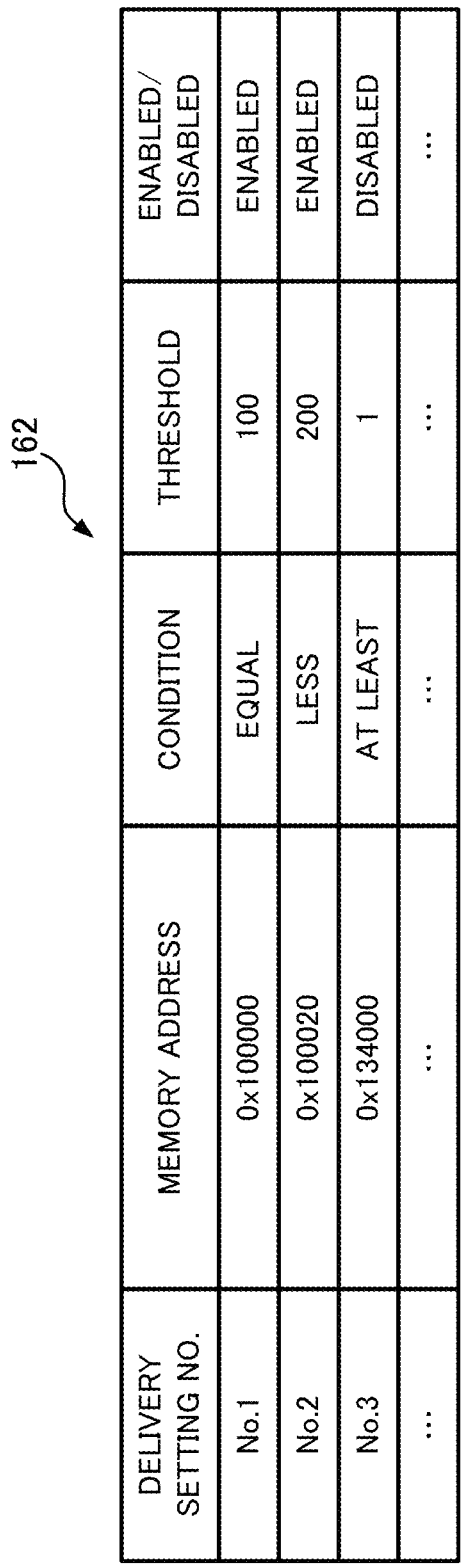
FIG. 6 is a drawing illustrating an example of data that is recorded in a startup condition table according to the embodiment.

FIG. 6 illustrates an example of data recorded in the startup condition table 162. Here, determination of enablement or disablement is specified to depend on a relationship between a threshold and a value stored in a memory address specified in the subsidiary storage 3 of the information processing device 11. In the illustrated example, the delivery setting number 1 is enabled when the value of the specified memory address matches the threshold, and the delivery setting number 2 is enabled when the value of the specified memory address is less than the threshold. The delivery setting number 3 is disabled when the value of the specified memory address is above the threshold.

FIG. 7 illustrates another example of data recorded in the startup condition table 162. Here, enablement or disablement of the delivery setting for a specified period of time is specified. In the illustrated example, the delivery setting number 4 is enabled for a period from a specified start date and start time to a specified end date and end time.

As illustrated in FIG. 3, the root OS 180 is installed in the information processing device 11, and upon power-up of the information processing device 11, the root OS 180 is first started up. The root OS 180 causes the hypervisor 110 to create and manage the virtual machines 12 and 13. The root OS 180 is implemented by the processor 1 executing a program stored in the subsidiary storage 3.

The root OS 180 includes the delivery manager 181 and the communicator 182. The delivery manager 181 is implemented by the root OS 180 executing the program 001 of the subsidiary storage 3. The communicator 182 is implemented by the root OS 180 executing the program 002 of the subsidiary storage 3. The delivery manager 181 is an example of the delivery management means of the present disclosure. The communicator 182 is an example of communication means of the present disclosure.

The delivery manager 181 performs processing relating to delivery of data whose source is the virtual machine 12 or 13 and for which the virtual machine 12 or 13 is specified as a destination.

First, processing is described that is performed by the delivery manager 181 when the virtual machines 12 and 13 set data in the shared memories 111 and 112. The delivery manager 181 delivers each of data set in the shared memories 111 and 112 to a delivery destination based on the aforementioned delivery information table 161 and the aforementioned startup condition table 162, or a destination specified by each of the virtual machines 12 and 13.

For example, when the virtual machine 12 determines, upon reception of the signal of the dataset notification, that the virtual machine 12 sets the data in the shared memory 111, the delivery manager 181 controls the backend driver 113 to read the data from the shared memory 111. The delivery manager 181 determines, based on the destination ID 1011, the source ID 1012, and the type 1013 of the read data, whether the delivery destination is recorded in the delivery information table 161.

When the information processing device 21, which is another information processing device, is specified as the delivery determination in the delivery information table 161 for the data read from the shared memory 111, the delivery manager 181 updates the header 1010 to send to the communicator 182 the data together with information indicating the information processing device 21 that is the delivery destination. When the delivery setting is not recorded in the delivery information table 161 for the data read from the shared memory 111, the delivery manager 181 does not update the header 1010 and controls the backend driver 113 to write the data into the shared memory 112 of the virtual machine 13. When the virtual machine 13 of its own information processing device 11 is specified as the delivery destination in the delivery information table 161 for the data read from the shared memory 111, the delivery manager 181 updates the header 1010 and controls the backend driver 113 to write the data into the shared memory 112 of the virtual machine 13.

The above is the processing performed by the delivery manager 181 when the virtual machines 12 and 13 set the data in the shared memories 111 and 112.

Next, the processing performed by the delivery manager 181 when the communicator 182 receives a communication packet from the information processing device 21 is described.

Upon receiving from the communicator 182 data that is the communication packet without a communication header 1040, the delivery manager 181 delivers the data for the virtual machine 12 or 13 based on the destination ID of the header 1010 of the data. For example, when the destination ID 1011 indicates the virtual machine 13, the delivery manager 181 controls the backend driver 113 to write the data into the shared memory 112 and send a signal of the dataset notification to the frontend driver 141. The delivery manager 181 also performs similar processing when the destination ID 1011 indicates the virtual machine 12. In this way, the data sent from the information processing device 21 that is another information processing device is delivered to the virtual machine 12 or 13.

The communicator 182 performs reception and transmission of communication packets via the communication path 50 toward the information processing device 21.

Figure 8:
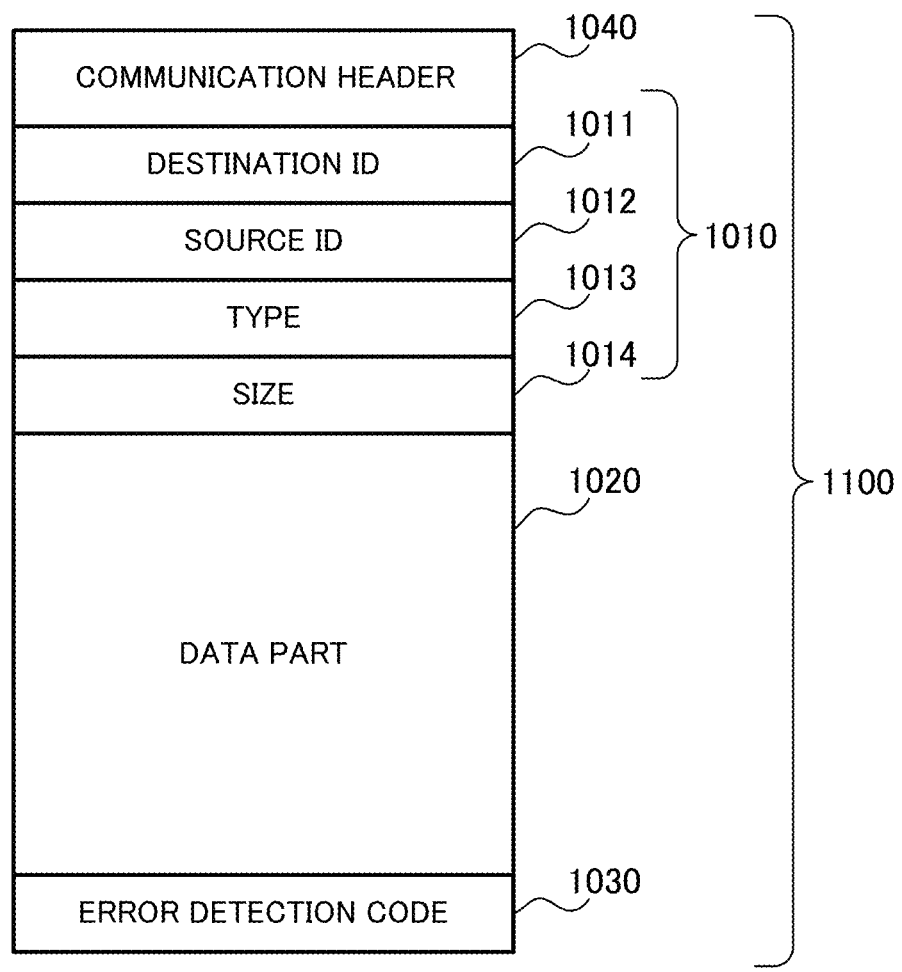
FIG. 8 is a drawing illustrating a configuration of data that is sent and received among the information processing devices according to the embodiment.

First, processing performed by the communicator 182 when the communicator 182 receives data destined for the information processing device 21 from the delivery manager 181 is described. Upon receiving from the delivery manager 181 the data destined for the information processing device 21 illustrated in FIG. 4 and the information of the delivery destination, the communicator 182 generates the communication header 1040 including information of the delivery destination. For example, communicator 182 generates as the communication header 1040 an IP header in accordance with a protocol of a LAN included in the communication path 50. As illustrated in FIG. 8, the communicator 182 generates the communication packet 1100 with the communication header 1040 added to the data destined for the information processing device 21 received from the delivery manager 181. The communicator 182 sends the generated communication packet 1100 via the communication path 50 to the information processing device 21.

Next, the processing performed by the communicator 182 when the communicator 182 receives the communication packet from the information processing device 21 is described. Upon receiving the communication packet 1100 from the information processing device 21, the communicator 182 sends to the delivery manager 181 data that is the communication packet 1100 without the communication header 1040.

Although the configuration of each part of the information processing device 11 is described above, the information processing device 21 has a similar configuration.

Next, a process flow of a series of steps when the virtual machines 12 and 13 of the information processing device 11 are sender's machines is described. Data that the virtual machines 12 and 13 set in the shared memories 111 and 112 may be hereinafter referred to as shared memory data. The shared memory data is an example of first data of the present disclosure.

Firstly, first delivery processing of the delivery manager 181 that receives dataset notification of the shared memory data from any one of the virtual machines 12 and 13 is described.

Figure 9:
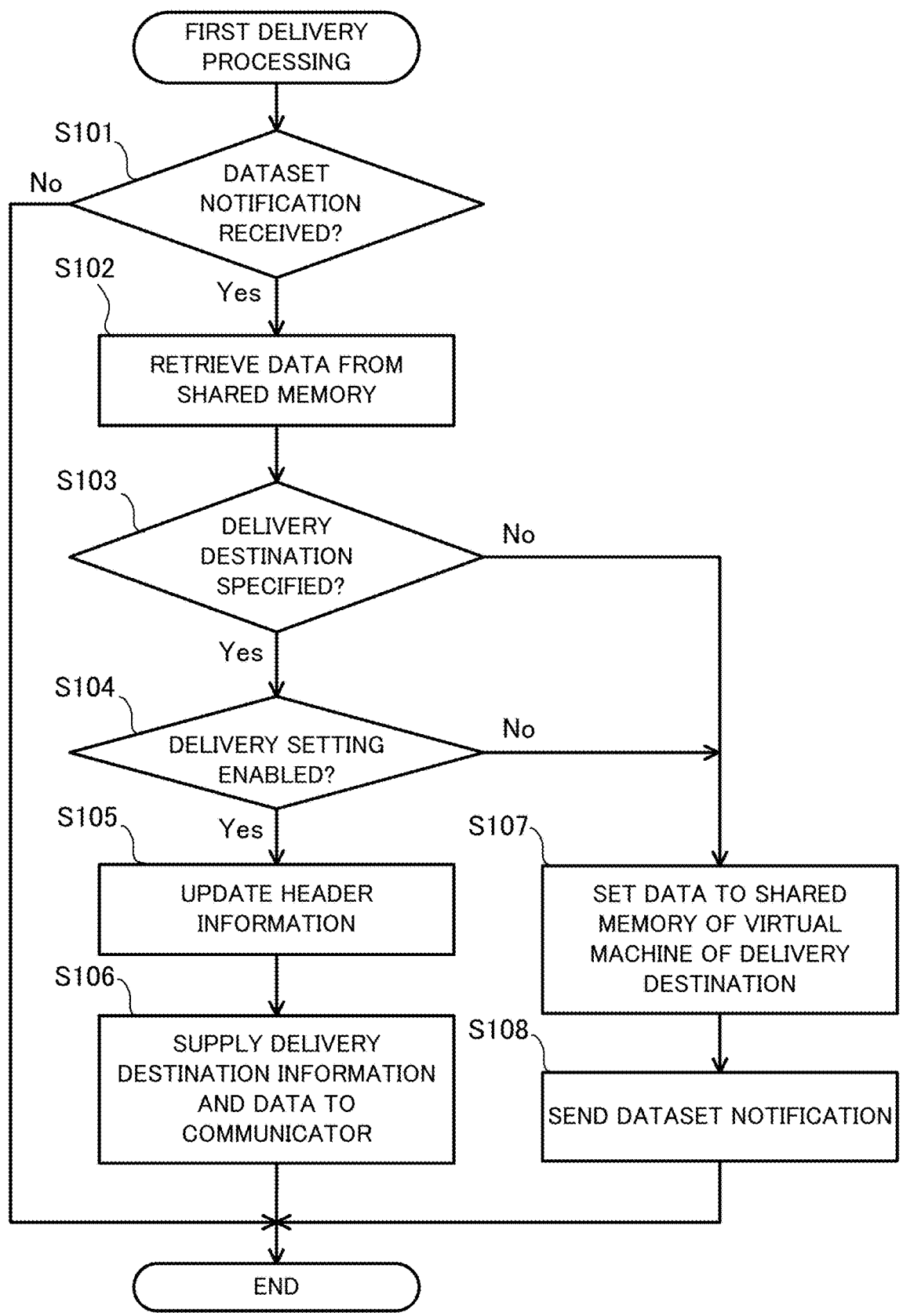
FIG. 9 is a flow chart of first delivery processing by a delivery manager of a sender's information processing device according to the embodiment.

As illustrated in FIG. 9, the delivery manager 181 determines at a predetermined frequency whether the delivery manager 181 has received a signal of the dataset notification (Step S101). Upon determination that the delivery manager 181 receives the signal of dataset notification (Yes in step S101), the delivery manager 181 controls the backend driver 113 to read shared memory data from a shared memory assigned to a virtual machine to which the signal of the dataset notification is sent among the virtual machines 12 and 13 (step S102). The read data is stored in a determined area of the subsidiary storage 3. For example, upon reception of the signal of the dataset notification from the virtual machine 12, the delivery manager 181 reads the shared memory data from the shared memory 111, the delivery manager 181 executes the following processing of the data stored in the determined area of the subsidiary storage 3 as follows.

The delivery manager 181 determines whether the delivery destination is set in the delivery information table 161 based on the destination ID 1011, the source ID 1012, and the type 1013 of the header 1010 of the data read from the shared memory (step S103). For example, since the data read from the shared memory 111 matches the delivery setting number 1 of the delivery information table 161 when the destination ID 1011 is "VM13" indicating the virtual machine 13, the source ID 1012 is "VM12" indicating the virtual machine 12, and the type 1013 is "APP", the delivery manager 181 determines that the delivery destination is specified (Yes in step S103).

The delivery manager 181 determines, with reference to the startup condition table 162, whether the delivery setting is enabled (step S104). For example, upon determination that a value of the specified memory address "0X1000000" is a threshold "100" for the delivery setting number 1, the delivery manager 181 determines that the delivery setting is enabled (Yes in step S104).

The delivery manager 181 updates a value of the header 1010 of the shared memory data read from the shared memory 111 (step S105). The value of the header 1010 is a value specified as an update header of the delivery information table 161. For example, for the delivery setting number 1, the delivery manager 181 updates the header 1010 such that the destination ID 1011 is "VM23", the source ID 1012 is "VM22", and the type 1013 is "APP1".

The delivery manager 181 supplies, to the communicator 182, the information indicating the information processing device that is the delivery destination in the delivery information table 161 and the shared memory data with the value with the updated value of the header 1010 (step S106).

By contrast, when the delivery manager 181 determines in step 103 that the delivery destination is not specified (No in step S103), the delivery manager 181 controls the backend driver 113 to write the shared memory data into the shared memory of the virtual machine indicating the destination ID 1011 included in the read shared memory data (step S107). Then the delivery manager 181 sends a signal of dataset notification to the frontend driver of the virtual machine indicating the destination ID 1011 (step S108). For example, when the destination ID 1011 of the shared memory data read from the shared memory 111 is "VM13" indicating the virtual machine 13, the delivery manager 181 writes the shared memory data into the shared memory 112 of the virtual machine 13. Then the delivery manager 181 sends a signal of the dataset notification to the frontend driver 141 of the virtual machine 13.

Upon determination in step S104 that the delivery setting is not enabled (No in step S104), the delivery manager 181 executes processing of the aforementioned steps S107 and S108. The above is the processing performed when the delivery manager 181 receives the signal of the dataset notification from any one of the virtual machines 12 and 14.

Next, the transmission processing of the communicator 182 to which the shared memory data and the information of the information processing device that is the delivery destination are supplied from the delivery manager 181 in step S106 of FIG. 9 is described.

Figure 10:
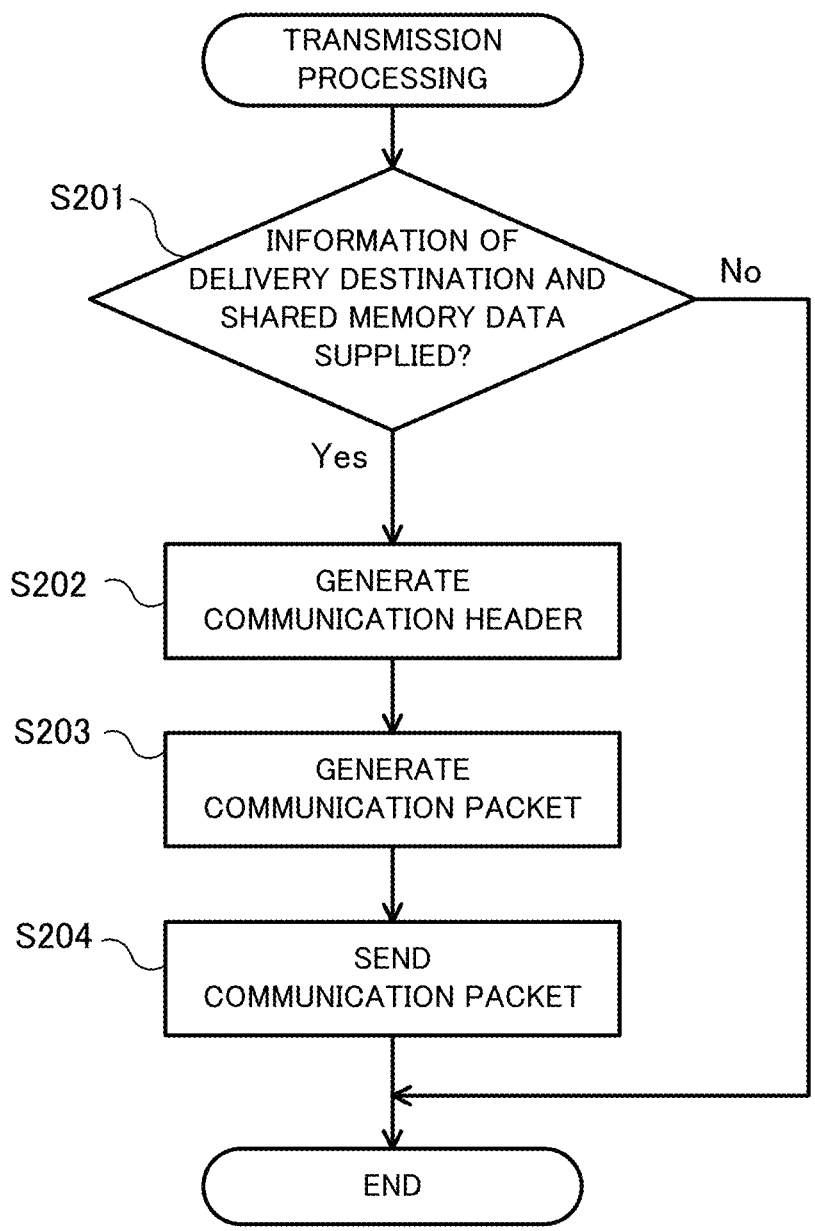
FIG. 10 is a flow chart of transmission processing by the communicator of the sender's information processing device according to the embodiment.

As illustrated in FIG. 10, the communicator 182 determines whether the communicator 182 receives from the delivery manager 181 the information indicating the information processing device that is the delivery destination and the shared memory data to be sent (step S201). When the communicator 182 receives the information indicating the information processing device that is the delivery destination and the shared memory data to be sent (Yes in step S201), the communicator 182 generates the communication header 1040 including the information indicating the information processing device that is the delivery destination (step S202).

The communicator 182 generates the communication packet (step S203) by adding the communication header 1040 generated in step S202 to the shared memory data to be sent that is received from the delivery manager 181 instep S201. Then the communicator 182 transmits the communication packet via the communication path 50 (step S204). The above is the transmission processing of the communicator 182.

Although the above description is given about the information processing device 11 as an example, the same applies to the case where the virtual machines 22 and 23 of the information processing device 21 are the sender's machines.

Next, a process flow of a series of steps when the virtual machines 12 and 13 of the information processing device are receiver's machines is described.

First, the reception processing of the communicator 182 when the communication packet including the shared memory data is transmitted by the information processing device 21 is described.

Figure 11:
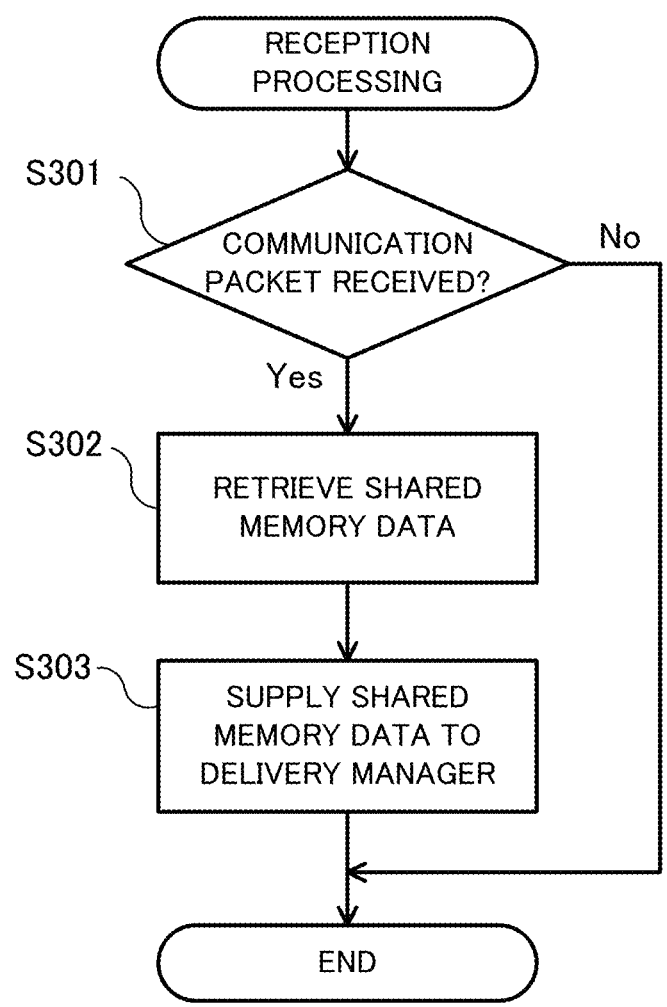
FIG. 11 is a flow chart of reception processing by the communicator of a receiver's information processing device according to the embodiment.

As illustrated in FIG. 11, the communicator 182 determines at a predetermined frequency whether the communicator 182 receives the communication packet via the communication path 50 (step S301), and upon determination that the communication packet is received (Yes in step S301), the communicator 182 retrieves the shared memory data from the received packet (step S302). Specifically, the communication header 1040 illustrated in FIG. 8 is removed from the communication packet. As illustrated in FIG. 11, the communicator 182 supplies the shared memory data to the delivery manager 181 (step S303). The above is communication processing of the communicator 182.

Next, second delivery processing of the delivery manager 181 to which the shared memory data is supplied from the communicator 182 in steps S303 of FIG. 11 is described.

Figure 12:
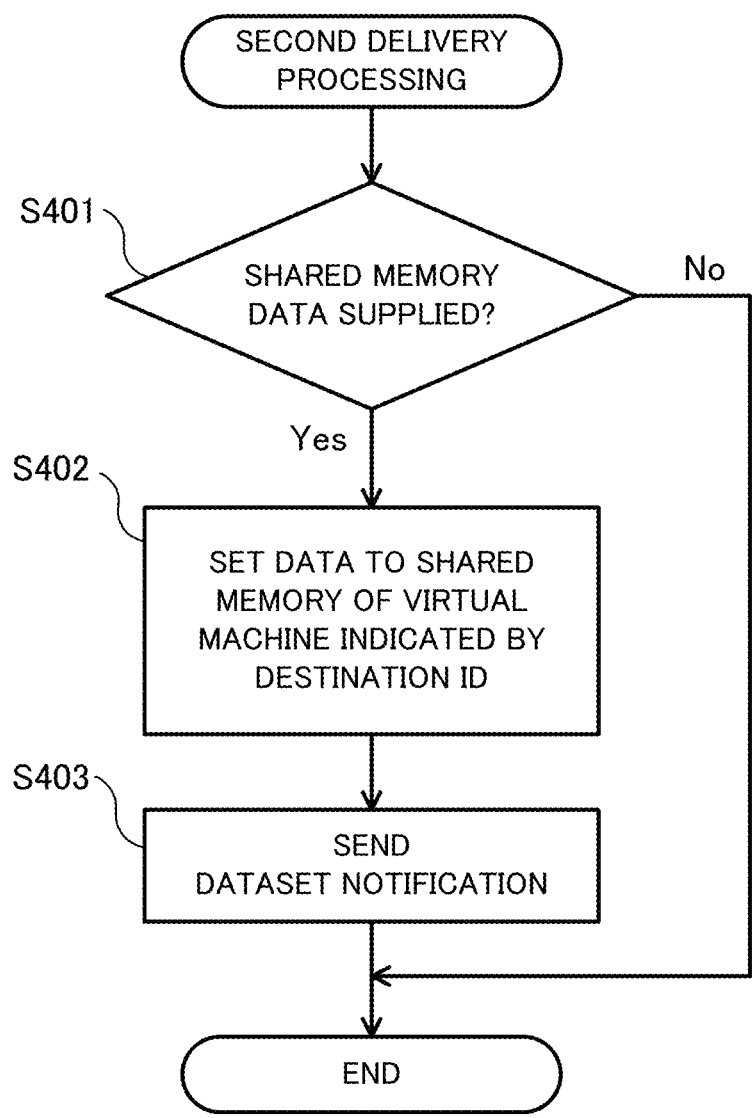
FIG. 12 is a flow chart of second delivery processing by the delivery manager of the receiver's information processing device according to the embodiment.

As illustrated in FIG. 12, the delivery manager 181 determines at a predetermined frequency whether the shared memory data is supplied from the communicator 182 (step S401). Upon supply of the shared memory data (Yes instep S401), the following processing is executed. The delivery manager 181 controls the backend driver 213 to set the shared memory data to the shared memory of the virtual machine indicated by the destination ID 1011 of the received shared memory data (step S402). The delivery manager 181 provides, to the frontend driver of the virtual machine indicated by the destination ID 1011, a signal of the dataset notification notifying that the data is set (step S403). The above is the second delivery processing of the delivery manager 181 that receives the shared memory data.

Although the above describes the information processing device 11 as an example, the same applies to the case where the virtual machines 22 and 23 of the information processing device 21 are the receiver's machines.

As described above, in the information processing device 11 according to the embodiment of the present disclosure, sending and receiving of data between the virtual machines 12 and 13 are performed via the root OS 180. When the data between the virtual machines 12 and 13 is specified to be transferred to the information processing device 21, the data is transferred to the information processing device 21. In this way, the virtual machines of the information processing devices can communicate with one another.

Although in the above description, the data to be sent and received between the virtual machines 12 and 13 of the information processing devices 11 is transferred to another information processing device 21, the data can be transferred between virtual machines in the information processing device 11. This is described in the following modified example.

Modified Example

Figure 13:
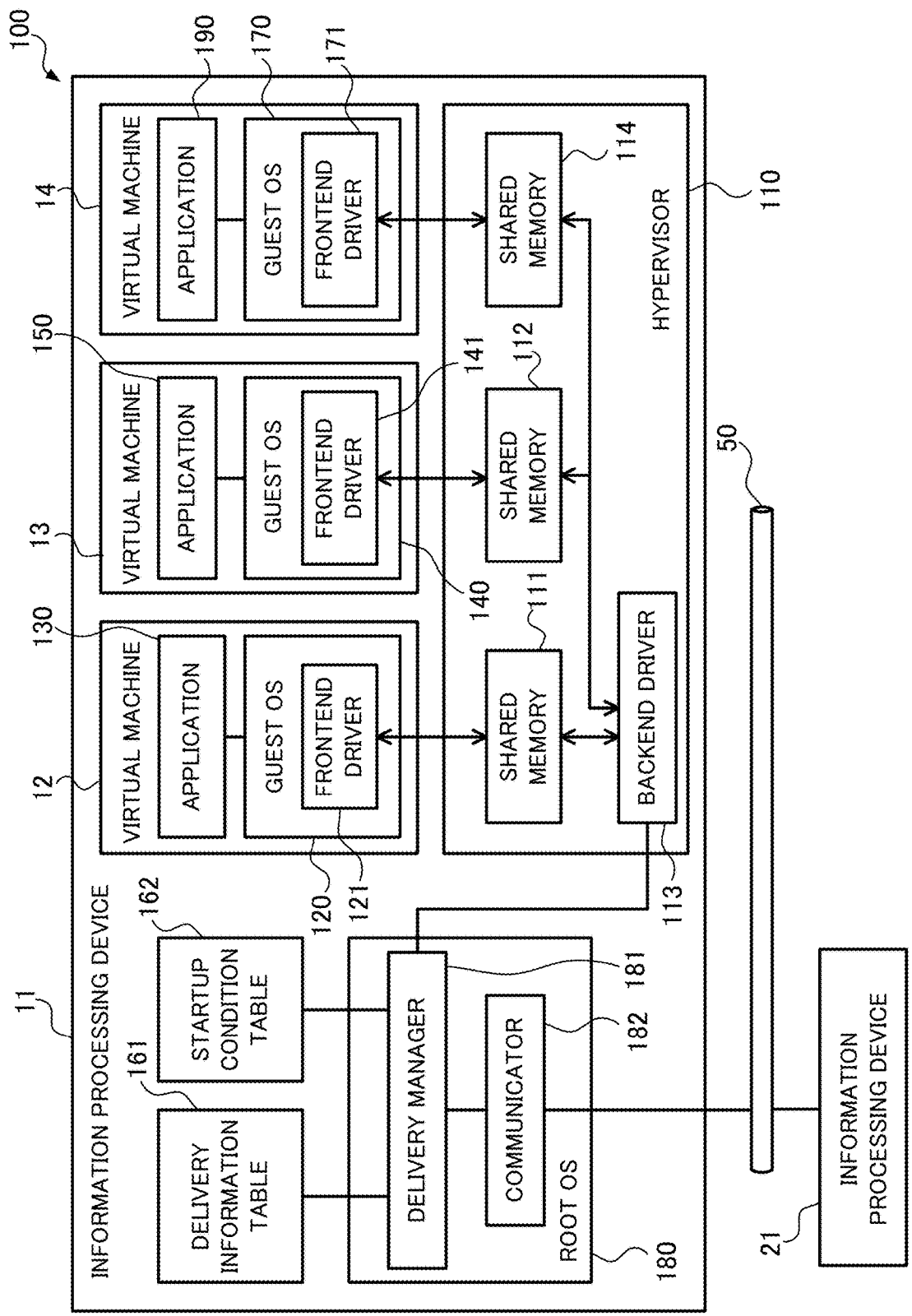
FIG. 13 is a functional block diagram of an information processing device according to a modified example.

As illustrated in FIG. 13, an information processing device 11 according to a modified example has a virtual machine 14 in addition to the virtual machines 12 and 13. Although illustration of the configuration of the information processing device 21 is omitted in FIG. 13, the configuration of the information processing device 21 is similar to that of the embodiment.

The virtual machine 14 functions as a computer that performs information processing similarly to that of the virtual machine 13. The virtual machine 14 is an example of the third virtual machine of the present disclosure. The guest OS 170 of the virtual machine 14 executes an application 190 for information processing, similarly to the guest OS 140 of the virtual machine 13. Since the virtual machine 14 has a configuration similar to that of the virtual machine 13, description of hardware and functions of the virtual machine 14 are omitted here.

The modified example is described assuming that the data to be sent and received between the virtual machines 12 and 13 within the information processing device 11 is transferred to the virtual machine 14 of the same information processing device 11. In this case, an example of data to be recorded in the delivery information table 161 is illustrated in FIG. 14. Here, an ID for identifying the virtual machine 14 is "VM14". The ID for identifying another virtual machine and the value of the type 1013 are similar to those of the embodiment. The description of the content of the delivery settings number 1 to number 4 is omitted since such content is similar to that of the embodiment.

As illustrated in FIG. 14, in the delivery setting number 5, the delivery destination is specified as the "local host" when the destination ID 1011 is "VM3", the source ID 1012 is "VM12", and the type 1013 is "APP1". In addition, each value of the header 1010 is specified to be updated such that the destination ID 1011 is "VM14", the source ID 1012 is "VM12", and the type 1013 is "APP1".

How the data is delivered based on the delivery setting number 5 is described. Here, the delivery setting number 5 is assumed to be enabled. The virtual machine 12 is assumed to have set to the shared memory 111 the output data of the application for numerical calculation to be destined for the virtual machine 13, and to have sent the dataset notification to the root OS 180. In this case, the shared memory 111 has the destination ID 1011 set to the "VM13", the source ID 1012 set to "VM12", and the type 1013 set to "APP1".

First delay management processing according to a modified example of the delivery manager 181 is described below with reference to FIG. 14. The description focuses on a configuration different from that of the embodiment.

Upon determination that the delivery manager 181 receives a signal of the dataset notification from the virtual machine 12 (Yes in step S101), the delivery manager 181 controls the backend driver 113 to read the shared memory data from the shared memory 111 to which the virtual machine 12 is assigned (step S102), and store the read data in a determined area of the subsidiary storage 3.

The delivery manager 181 determines whether the delivery destination is set in the delivery information table 161 based on the destination ID 1011, the source ID 1012, and the type 1013 of the header 1010 of the data read from the shared memory. Here, as illustrated in FIG. 14, since the values of the destination ID 1011, the source ID 1012, and the type 1013 match those of the delivery setting number 5, as illustrated in FIG. 15, the delivery manager 181 determines that the delivery destination is specified (Yes in step S103).

The delivery manager 181 determines with reference to the startup condition table 162 whether the delivery setting is enabled or not (step S104), the delivery manager 181 determines that the delivery setting number 5 is enabled (Yes in step S104).

The delivery manager 181 updates the values of the header 1010 of the shared memory data read from the shared memory 111 with the values specified as the update header of the delivery information table 161 (step S105). As illustrated in FIG. 14, for the delivery setting number 5, the delivery manager 181 updates the header 1010 such that the destination ID 1011 is "VM14", the source ID 1012 is "VM12", and the type 1013 is "APP1".

Figure 15:
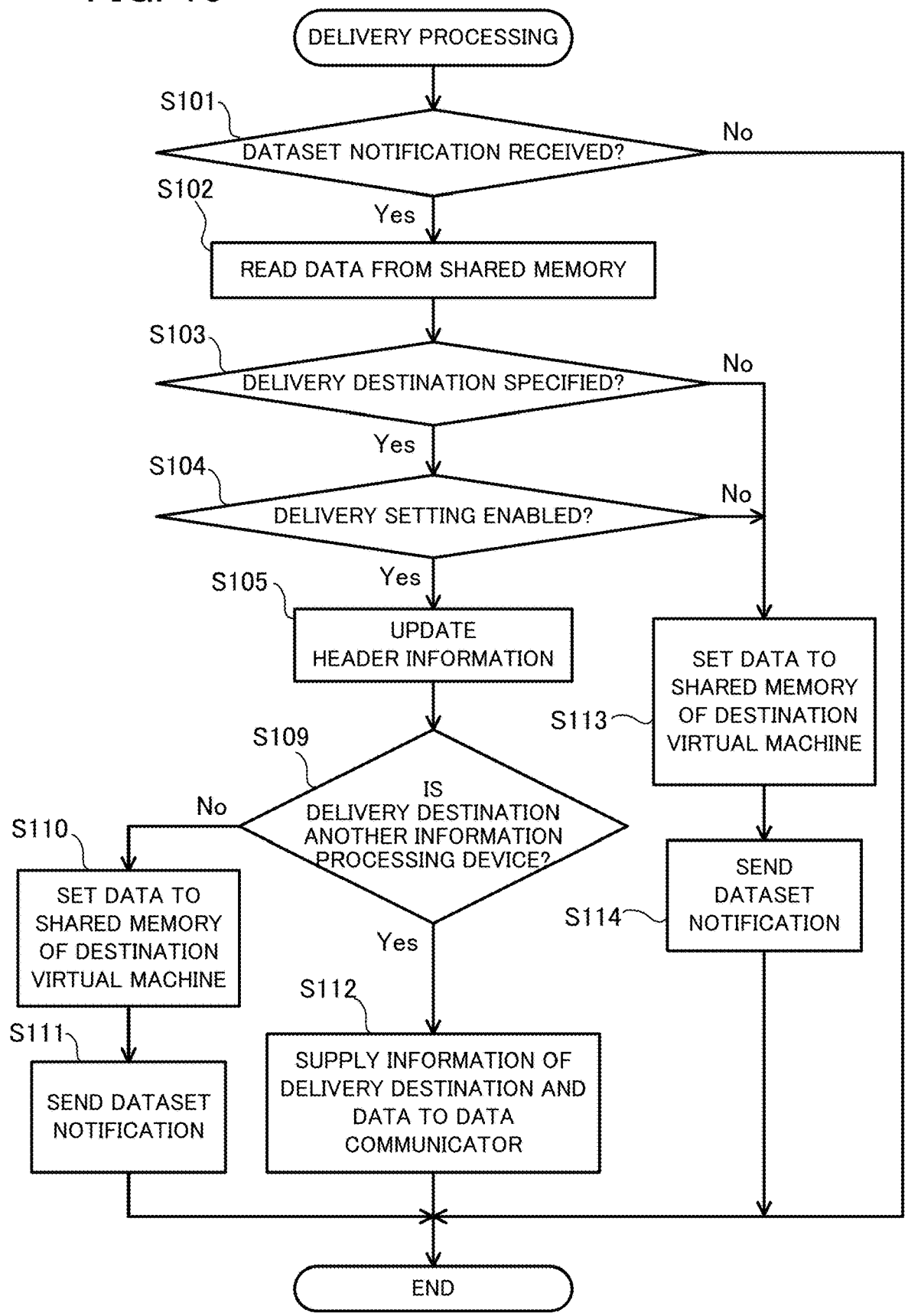
FIG. 15 is a flow chart of delivery processing by a delivery manager of the information processing device according to the modified example.

As illustrated in FIG. 15, the delivery manager 181 determines whether the delivery destination of the delivery information table 161 is another information processing device, that is, a device other than the information processing device 11 (step S109). As illustrated in FIG. 14, for the delivery setting No. 5, since the delivery destination is the "local host", as illustrated in FIG. 15, the delivery manager 181 determines that the delivery destination is not another information processing device 21 (No in step S109).

The delivery manager 181 controls the backend driver 113 to writes the shared memory data into the shared memory of the destination virtual machine indicated by the delivery setting (step S110). Here, the delivery manager 181 writes the shared memory data into the shared memory 114 assigned to the virtual machine 14. Then the delivery manager 181 sends a signal of dataset notification to the frontend driver 171 of the virtual machine 14 (step S111).

By contrast, as illustrated in FIG. 15, in step S106, upon determination that the delivery destination is another information processing device (Yes in step S109), the delivery manager 181 supplies to the communicator 182 the information indicating the destination information processing device of the delivery information table 161 and the shared memory data with the updated values of the header 1010 (step S112).

In step S103, the processing performed when the delivery manager 181 determines that the delivery destination is not specified in the delivery information table 161 (No in step S103) is similar to that of the embodiment. In step S104, the processing performed when that the delivery setting is not enabled (No in step S104) is similar to that of the embodiment.

As described in the embodiment and the modified example, when the data to be sent and received among the virtual machines is specified to be transferred to another information processing device in the delivery information table 161, the information processing device according to the present disclosure sends the data not to the to-be-destined virtual machine but to the specified other information processing device. With such a configuration, communication among the virtual machines of information processing devices is enabled without changing of the virtual machine side settings.

In the modified example, when a virtual machine different from the destination ID 1011 written by the virtual machine into the shared memory is specified in the delivery information table 161, the delivery manager 181 delivers the data for the shared memory assigned to the specified virtual machine. In this way, the data can also be transferred to the virtual machine in the same information processing device.

The delivery destination of the data is specified based on the destination ID 1011, the source ID 1012, and the type 1013 in the delivery information table 261. Thus for a particular application, communication among the virtual machines is enabled among the information processing devices. In addition, even in the communication among the virtual machines in the same information processing device, data can similarly be sent and received among particular applications.

Since whether the delivery setting of each item in the delivery information table 261 is enabled or disabled can be set in the startup condition table 262, for example when sending and receiving of data among applications are tested, unrelated communication with an application other than a target application can be eliminated.

The guest operating system of the virtual machine sends to the root operating system a signal of a dataset notifying that the data is written into the shared memory. It is sufficient that this root operating system can read the data of the shared memory when receiving a signal of the dataset, and monitoring the shared memory assigned to each virtual machine is not necessary. The root operating system can also identify the virtual machine written into the shared memory without depending on information of the header 1010.

The delivery manager 181 notifies the target guest operating system of the signal of the dataset notifying that the data is written into the shared memory. It is thereby sufficient that the guest operating system retrieves data from the shared memory when receiving the signal of dataset and monitoring of the shared memory is unnecessary.

When multiple virtual machines run on a single information processing device, the virtual machines may lack resources since the virtual machines physically use a hardware resource of a single information processing device. However, since the embodiment enables communication among virtual machines of two or more information processing devices, the occurrence of the lack of hardware resources of the information processing device can be avoided.

In the aforementioned example, enablement or disablement of the delivery setting is determined using the startup condition tables 162 and 262. However, the information processing devices 11 and 21 do not require use of the startup condition table 162 and 262. In this case, all the delivery settings recorded in the delivery information table 161 and 261 may be set to be enabled, and when setting the delivery setting to be disabled is desired, the delivery setting may be deleted from the delivery information tables 161 and 261. In this case, it is sufficient that each of the information processing devices 11 and 21 has only a single table of the startup condition tables 162 and 262, and thus maintenance operations for tables are easy.

Alternatively, as illustrated in FIG. 16, a startup condition field may be added to the delivery information tables 161 and 261. In this case, since it is sufficient that the information processing devices 11 and 21 has only one table of the startup condition table 162 and 262, maintenance operations of the tables.

Figure 17:
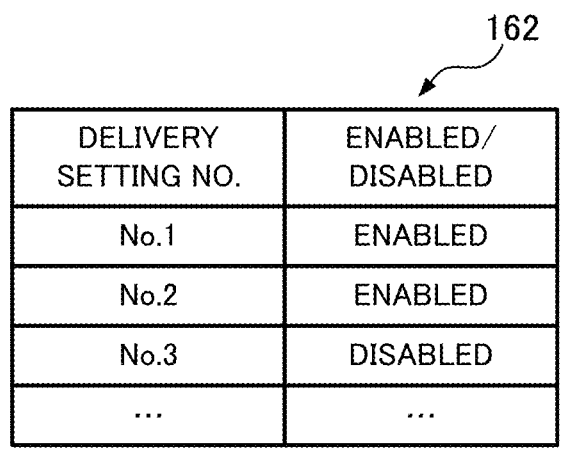
FIG. 17 is a drawing illustrating yet another example of data that is recorded in a startup condition table.

Alternatively, the startup condition table 162 and 262 may have only a field of for specifying enablement/disablement. In the example illustrated in FIG. 17, enablement or disablement is just simply specified without conditions.

Figure 18:
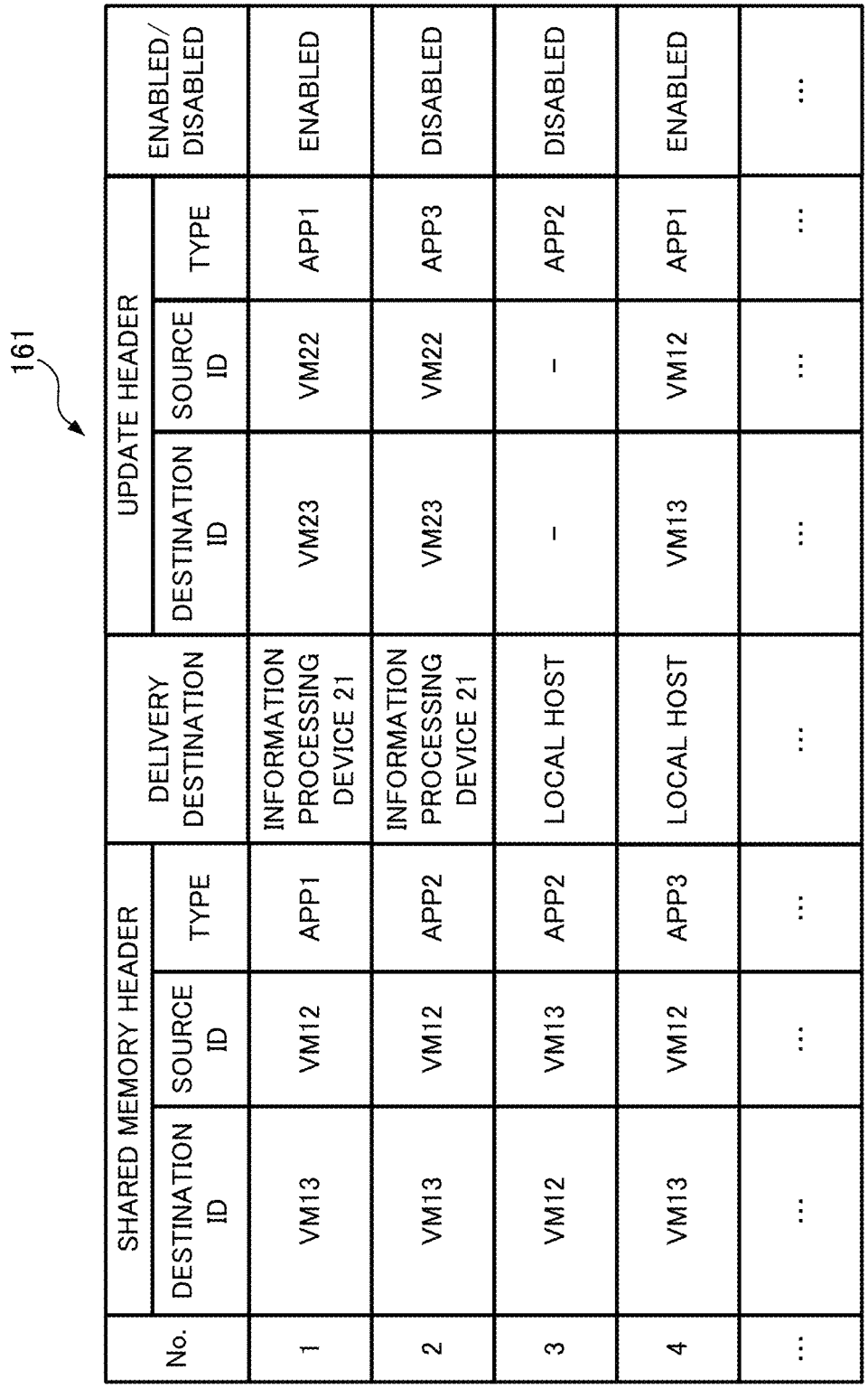
FIG. 18 is a drawing illustrating still yet another example of data that is recorded in the delivery information table.

Alternatively, as illustrated in FIG. 18, enablement or disablement of the delivery information may be specified by adding a field specifying enablement/disablement in the delivery information tables 161 and 261 and changing the value. In the example illustrated in FIG. 18, enablement or disablement is just simply specified without conditions.

Although one shared memory is assigned to each virtual machine in the embodiment and modified example, all the virtual machines may write the data to be sent to another virtual machine into the same shared memory. In this case, the root OS 180 can also determine, based on the source ID 1012 of the header 1010 written into the shared memory, by which virtual machine the data is written.

The number of virtual machines built on a single information processing device is not limited to two or three, but rather may be more than three. Alternatively, the number of virtual machines built on a single information processing device may be one. For example, a virtual machine 23 may be built alone in the information processing device 21. In this case, a simulator 94 may also be connected to the virtual machine 22. For example, when an operation of the application 150 of the virtual machine 13 is tested, the virtual machine 13 of the information processing device 11 communicates with the virtual machine 23 of the information processing device 21, thereby avoiding affecting operating conditions between the inspection device 93 and the drive devices 91 and 92. In addition, the information processing device 21 may have specifications with which a single virtual machine 23 can be built. Thus, for example, the information processing device 21 does not need to have specifications equivalent to those of the information processing device 11. Thus reduction in cost can be achieved.

In the aforementioned example, the communication path 50 is a part of a LAN, and thus the information processing devices 11 and 21 communicate with each other using the LAN. However, the communication path 50 is not limited to such configuration. For example, the communication path 50 may use a communication cable based on the USB standards, and the information processing devices 11 and 21 may communicate with each other via the USB. Alternatively, the communication path 50 does not need to be a wired cable. The information processing devices 11 and 21 may communicate with each other using a wireless LAN or a wireless personal area network (WPAN).

Although the aforementioned example describes an example in which a single virtual machine executes only a single application, a single virtual machine may execute a plurality of applications.

Examples of the recording medium storing a program executed by the aforementioned root OS 180 include a USB memory, a flexible disc, a compact disc (CD), a digital versatile disc (DVD), a Blu-ray (registered trademark) disc, a magneto-optical disc (MO), a secure digital (SD) card. Memory Stick (registered trademark), and other computer-readable recording media such as a magnetic disc, an optical disc, a magneto-optical disc, a semiconductor memory, and a magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 001, 002 Program
1 Processor
2 Main storage
3 Subsidiary storage
4 Communication controller
9 Bus
11, 21 Information processing device
12, 13, 14, 22, 23 Virtual machine
50 Communication path
91, 92 Drive device
93 Inspection device
94 Simulator
100 Information processing system
110, 210 Hypervisor
111, 112, 114, 211, 212 Shared memory
113, 213 Backend driver
120, 140, 220, 240 Guest operating system
121, 141, 171, 221, 241 Frontend driver
130, 150, 190, 230, 250 Application
161, 261 Delivery information table
162, 262 Startup condition table
180, 280 Root OS
181, 281 Delivery manager
182, 282 Communicator
1010 Header
1011 Destination ID
1012 Source ID
1013 Type
1014 Size
1020 Data part
1030 Error detection cord
1040 Communication header
1100 Communication packet

The invention claimed is:

1. An information processing device on which a virtual environment including virtual machines is built, the information processing device comprising:
a root operating system to operate on the information processing device;
guest operating systems to operate on the corresponding virtual machines;
a shared memory accessible by the guest operating systems and the root operating system; and
a delivery information memory for specifying a relationship between (i) destination information indicating destinations of data specified by the virtual machines and source information indicating sources of the data, and (ii) a delivery destination for the data to be actually delivered, wherein
the root operating system comprises delivery management circuitry configured to manage delivery of data output by the virtual machines and communication circuitry configured to communicate via a communication path with another information processing device,
when the guest operating system of a first virtual machine of the virtual machines writes, into the shared memory, first data that is destined for a second virtual machine of the virtual machines together with the destination information and the source information, the delivery management circuitry determines whether a delivery destination corresponding to the destination information and the source information is specified in the delivery information memory,
in response to the determination that the delivery destination corresponding to the destination information and the source information is specified in the delivery information memory and a subsequent determination that the another information processing device is specified in the delivery information memory as the delivery destination corresponding to the destination information and the source information, the delivery management circuitry supplies the first data to the communication circuitry and the communication circuitry transmits to the another information processing device the first data supplied from the delivery management circuitry, and
in response to the determination that the delivery destination corresponding to the destination information and the source information is not specified in the delivery information memory, the delivery management circuitry delivers the first data to the second virtual machine.

2. The information processing device according to claim 1, wherein upon determination that a third virtual machine of the virtual machines on the information processing device is specified in the delivery information memory as the delivery destination corresponding to the destination information and the source information, the delivery management circuitry delivers the first data to the third virtual machine.

3. The information processing device according to claim 2, wherein
the delivery information memory specifies, based on the destination information and the source information and identification information for identifying an application that runs on the virtual machine, a delivery destination of data sent and received among the virtual machines,
the guest operating system of the first virtual machine writes, into the shared memory, data destined for the second virtual machine together with the destination information and the source information and the identification information, the data being output by the application that runs on the first virtual machine, and
the delivery management circuitry determines a destination for delivery of the first data based on the destination information and the source information and the identification information that are read from the shared memory.

4. The information processing device according to claim 3, further comprising:
enablement/disablement setting conditions memory in which is set whether or not specifying of the delivery destination by the delivery information memory is enabled, wherein
when the delivery management circuitry determines, in the first data read from the shared memory, that the specifying of the delivery destination is enabled in the enablement/disablement setting conditions memory in a case in which the delivery destination is specified in the delivery information memory, the delivery management circuitry delivers the first data to the delivery destination specified in the delivery information memory.

5. The information processing device according to claim 3, wherein
upon writing the first data into the shared memory, the guest operating system of the first virtual machine notifies the root operating system that writing of the data into the shared memory is complete, and
upon receiving the notification from the guest operating system of the first virtual machine that writing of the data is complete, the root operating system reads the first data from the shared memory.

6. The information processing device according to claim 2, further comprising:
enablement/disablement setting conditions memory in which is set whether or not specifying of the delivery destination by the delivery information memory is enabled, wherein
when the delivery management circuitry determines, in the first data read from the shared memory, that the specifying of the delivery destination is enabled in the enablement/disablement setting conditions memory in a case in which the delivery destination is specified in the delivery information memory, the delivery management circuitry delivers the first data to the delivery destination specified in the delivery information memory.

7. The information processing device according to claim 2, wherein
upon writing the first data into the shared memory, the guest operating system of the first virtual machine notifies the root operating system that writing of the data into the shared memory is complete, and
upon receiving the notification from the guest operating system of the first virtual machine that writing of the data is complete, the root operating system reads the first data from the shared memory.

8. The information processing device according to claim 2, wherein
upon writing the first data into the shared memory to deliver the first data to the delivery destination thereof, the delivery management circuitry notifies the guest operating system of the virtual machine that is a destination for delivery of the first data that writing of the first data into the shared memory is complete, and
upon receiving the notification from the delivery management circuitry that writing of the first data is complete, the guest operating system of the virtual machine to which the first data is delivered reads the first data from the shared memory.

9. The information processing device according to claim 1, wherein
the delivery information memory specifies, based on the destination information and the source information and identification information for identifying an application that runs on the virtual machine, a delivery destination of data sent and received among the virtual machines,
the guest operating system of the first virtual machine writes, into the shared memory, data destined for the second virtual machine together with the destination information and the source information and the identification information, the data being output by the application that runs on the first virtual machine, and
the delivery management circuitry determines a destination for delivery of the first data based on the destination information and the source information and the identification information that are read from the shared memory.

10. The information processing device according to claim 9, further comprising:
enablement/disablement setting conditions memory in which is set whether or not specifying of the delivery destination by the delivery information memory is enabled, wherein
when the delivery management circuitry determines, in the first data read from the shared memory, that the specifying of the delivery destination is enabled in the enablement/disablement setting conditions memory in a case in which the delivery destination is specified in the delivery information memory, the delivery management circuitry delivers the first data to the delivery destination specified in the delivery information memory.

11. The information processing device according to claim 9, wherein
upon writing the first data into the shared memory, the guest operating system of the first virtual machine notifies the root operating system that writing of the data into the shared memory is complete, and
upon receiving the notification from the guest operating system of the first virtual machine that writing of the data is complete, the root operating system reads the first data from the shared memory.

12. The information processing device according to claim 9, wherein
upon writing the first data into the shared memory to deliver the first data to the delivery destination thereof, the delivery management circuitry notifies the guest operating system of the virtual machine that is a destination for delivery of the first data that writing of the first data into the shared memory is complete, and
upon receiving the notification from the delivery management circuitry that writing of the first data is complete, the guest operating system of the virtual machine to which the first data is delivered reads the first data from the shared memory.

13. The information processing device according to claim 1, further comprising:
an enablement/disablement setting conditions storing memory in which is set whether or not specifying of the delivery destination by the delivery information memory is enabled, wherein
when the delivery management circuitry determines, in the first data read from the shared memory, that the specifying of the delivery destination is enabled in the enablement/disablement setting conditions memory in a case in which the delivery destination is specified in the delivery information memory, the delivery management circuitry delivers the first data to the delivery destination specified in the delivery information memory.

14. The information processing device according to claim 13, wherein
upon writing the first data into the shared memory, the guest operating system of the first virtual machine notifies the root operating system that writing of the data into the shared memory is complete, and
upon receiving the notification from the guest operating system of the first virtual machine that writing of the data is complete, the root operating system reads the first data from the shared memory.

15. The information processing device according to claim 13, wherein
upon writing the first data into the shared memory to deliver the first data to the delivery destination thereof, the delivery management circuitry notifies the guest operating system of the virtual machine that is a destination for delivery of the first data that writing of the first data into the shared memory is complete, and upon receiving the notification from the delivery management circuitry that writing of the first data is complete, the guest operating system of the virtual machine to which the first data is delivered reads the first data from the shared memory.

16. The information processing device according to claim 1, wherein upon writing the first data into the shared memory, the guest operating system of the first virtual machine notifies the root operating system that writing of the data into the shared memory is complete, and upon receiving the notification from the guest operating system of the first virtual machine that writing of the data is complete, the root operating system reads the first data from the shared memory.

17. The information processing device according to claim 16, wherein upon writing the first data into the shared memory to deliver the first data to the delivery destination thereof, the delivery management circuitry notifies the guest operating system of the virtual machine that is a destination for delivery of the first data that writing of the first data into the shared memory is complete, and upon receiving the notification from the delivery management circuitry that writing of the first data is complete, the guest operating system of the virtual machine to which the first data is delivered reads the first data from the shared memory.

18. The information processing device according to claim 1, wherein upon writing the first data into the shared memory to deliver the first data to the delivery destination thereof, the delivery management circuitry notifies the guest operating system of the virtual machine that is a destination for delivery of the first data that writing of the first data into the shared memory is complete, and upon receiving the notification from the delivery management circuitry that writing of the first data is complete, the guest operating system of the virtual machine to which the first data is delivered reads the first data from the shared memory.

19. A method for delivering data sent and received among virtual machines on an information processing device on which a virtual environment including the virtual machines is built, the information processing device comprising a root operating system to operate on the information processing device, guest operating systems to operate on the corresponding virtual machines, a shared memory accessible by the guest operating systems and the root operating system, and delivery information memory for specifying a relationship between (i) destination information indicating destinations of data specified by the virtual machines and source information indicating sources of the data, and (ii) delivery destination for the data to be actually delivered, the method comprising:

writing, into the shared memory by the guest operating system of a first virtual machine of the virtual machines, first data that is destined for a second virtual machine of the virtual machines together with the destination information and the source information;

determining, by the root operating system, whether a delivery destination corresponding to the destination information and the source information written into the shared memory is specified in the delivery information memory;

in response to a determination that the delivery destination of the first data is specified in the delivery information memory, determining, by the root operating system, whether another information processing device is specified in the delivery information memory as the delivery destination;

in response to a determination that the another information processing device is specified in the delivery information memory as the delivery destination corresponding to the destination information and the source information, transmitting, by the root operating system, the first data to the another information processing device; and in response to the determination that the delivery destination corresponding to the destination information and the source information is not specified in the delivery information memory, delivering the first data to the second virtual machine by the root operating system.

20. A non-transitory computer readable medium including instructions for execution by a root operating system that operates on an information processing device on which a virtual environment including virtual machines is built, the information processing device comprising the root operating system, guest operating systems to operate on the corresponding virtual machines, a shared memory accessible by the guest operating systems and the root operating system, and delivery information memory for specifying a relationship between (i) destination information indicating destinations of data sent and received among the virtual machines and source information indicating sources of the data, and (ii) delivery destination for the data to be actually delivered, the program causing the root operating system to execute instructions comprising:

when the guest operating system of a first virtual machine of the virtual machines writes, into the shared memory, first data that is destined for a second virtual machine of the virtual machines together with the destination information and the source information, determining whether a delivery destination corresponding to the destination information and the source information is specified in the delivery information memory, when in response to a determination that the delivery destination for the first data is specified in the delivery information memory, determining whether another information processing device is specified in the delivery information memory as the delivery destination;

in response to a determination that the another information processing device is specified in the delivery information memory as the delivery destination corresponding to the destination information and the source information, transmitting the first data to the another information processing device; and in response to the determination that the delivery destination corresponding to the destination information and the source information is not specified in the delivery information memory, delivering the first data to the second virtual machine.

* * * * *